(12) United States Patent
James

(10) Patent No.: US 10,062,366 B2
(45) Date of Patent: Aug. 28, 2018

(54) RINGTONE SEQUENCES BASED ON MUSIC HARMONY, MODULATION SYMBOLS AND CALLING TELEPHONE NUMBER

(71) Applicant: Saronikos Trading and Services, Unipessoal Lda, Funchal, Madeira (PT)

(72) Inventor: Robert James, Hatfield (GB)

(73) Assignee: Saronikos Trading and Services, Unipessoal LDA, Funchal, Madeira (PT)

( * ) Notice: Subject to any disclaimer, the term of this patent is extended or adjusted under 35 U.S.C. 154(b) by 0 days.

(21) Appl. No.: 15/518,213

(22) PCT Filed: Oct. 20, 2014

(86) PCT No.: PCT/EP2014/072430
§ 371 (c)(1),
(2) Date: Apr. 10, 2017

(87) PCT Pub. No.: WO2016/062325
PCT Pub. Date: Apr. 28, 2016

(65) Prior Publication Data
US 2017/0309263 A1    Oct. 26, 2017

(51) Int. Cl.
*A63H 5/00* (2006.01)
*G04B 13/00* (2006.01)
(Continued)

(52) U.S. Cl.
CPC ........ *G10H 1/0025* (2013.01); *H04M 19/041* (2013.01); *G10H 2210/111* (2013.01); *G10H 2210/145* (2013.01); *G10H 2230/021* (2013.01)

(58) Field of Classification Search
CPC .. G10H 1/0041; G10H 2240/145; G10H 1/26; G10H 1/36; G10H 2240/131;
(Continued)

(56) References Cited

U.S. PATENT DOCUMENTS

| | | |
|---|---|---|
| 7,586,031 B1 | 9/2009 | Baker |
| 2004/0118267 A1* | 6/2004 | Harrison ............... G09B 15/00 84/470 R |

(Continued)

FOREIGN PATENT DOCUMENTS

| | | |
|---|---|---|
| CN | 202444539 U | 9/2012 |
| EP | 1 501 072 A1 | 1/2005 |

(Continued)

OTHER PUBLICATIONS

International Search Report dated May 29, 2015, issued in PCT Application No. PCT/EP2014/072430, filed Oct. 20, 2014.

(Continued)

*Primary Examiner* — Marlon Fletcher
(74) *Attorney, Agent, or Firm* — Workman Nydegger

(57) ABSTRACT

An apparatus for generating a reproducible audio information sequence includes a receiver adapted to receive and decode a signal in which at least one sequence of symbols is encoded to which an audio information sequence is to correspond, memory storing a plurality of reproducible audio elements, a processor configured for associating one of the reproducible audio elements with at least one first symbol included in the sequence of symbols on the basis of the first symbol and of at least one second symbol that, in the sequence of symbols, precedes or follows the first symbol, and a sound generator for outputting audio sequences, configured for cyclically reproducing said reproducible audio information sequence.

17 Claims, 7 Drawing Sheets

(51) Int. Cl.
   *G10H 1/00* (2006.01)
   *H04M 19/04* (2006.01)
(58) Field of Classification Search
   CPC ......... G10H 2220/00; G10H 2220/155; G10H 2220/261; G10K 15/04; G10G 1/04
   See application file for complete search history.

(56) References Cited

U.S. PATENT DOCUMENTS

| | | | |
|---|---|---|---|
| 2005/0243996 | A1 | 11/2005 | Fitchmun |
| 2008/0066609 | A1 | 3/2008 | Bourgeois |
| 2013/0303132 | A1 | 11/2013 | Kwong |
| 2013/0305909 | A1* | 11/2013 | Kwan ................... G10L 25/51 84/645 |
| 2014/0174279 | A1* | 6/2014 | Wong ................... G10H 1/0025 84/609 |
| 2016/0125857 | A1* | 5/2016 | Allen ................... G10G 1/04 84/475 |

FOREIGN PATENT DOCUMENTS

| | | | | |
|---|---|---|---|---|
| FR | 1072512 A | | 9/1954 | |
| WO | WO 2016062325 A1 * | | 4/2016 | ........... G10H 1/0025 |

OTHER PUBLICATIONS

European Office Action dated Mar. 28, 2018, issued in EP Application No. 14786664.4.

* cited by examiner

| | a | |
|---|---|---|
| 0 |  | ⇒ b1 ⇒ c ⇒ d1 |
| 1 |  | ⇒ b2 ⇒ c ⇒ d1 |
| 2 |  | ⇒ b2 ⇒ c ⇒ d1 |
| 3 |  | ⇒ b1 ⇒ c ⇒ d1 |
| 4 |  | ⇒ b2 ⇒ c ⇒ d1 |
| 5 |  | ⇒ b1 ⇒ c ⇒ d2 |
| 6 |  | ⇒ b2 ⇒ c ⇒ d2 |
| 7 |  | ⇒ b2 ⇒ c ⇒ d2 |
| 8 |  | ⇒ b1 ⇒ c ⇒ d2 |
| 9 |  | ⇒ b2 ⇒ c ⇒ d2 |

| T5 | | a34 | |
|---|---|---|---|
| 0 | Tone 1 |  | ⇒ b3 ⇒ c3 ⇒ d3 |
| 1 | |  | ⇒ b3 ⇒ c3 ⇒ d3 |
| 2 | |  | ⇒ b3 ⇒ c3 ⇒ d3 |
| 3 | |  | ⇒ b3 ⇒ c3 ⇒ d3 |
| 4 | |  | ⇒ b3 ⇒ c3 ⇒ d3 |
| 5 | Tone 2 |  | ⇒ b4 ⇒ c4 ⇒ d4 |
| 6 | |  | ⇒ b4 ⇒ c4 ⇒ d4 |
| 7 | |  | ⇒ b4 ⇒ c4 ⇒ d4 |
| 8 | |  | ⇒ b4 ⇒ c4 ⇒ d4 |
| 9 | |  | ⇒ b4 ⇒ c4 ⇒ d4 |

RINGTONE SEQUENCES BASED ON MUSIC HARMONY, MODULATION SYMBOLS AND CALLING TELEPHONE NUMBER

BACKGROUND OF THE INVENTION

1. The Field of the Invention

The present invention relates to an apparatus and a method for generating an audio information sequence that can be reproduced by audio reproduction means, such as, for example, a loudspeaker, an earphone, or the like.

2. Present State of the Art

The most typical application of this invention is the generation of telephone ringtones, which allow a user of a telephone terminal, preferably a mobile one, to recognize the caller. Other applications are nevertheless also conceivable, wherever it may be useful for a person to be able to recognize the occurrence of events by means of sounds, while still preserving his/her privacy towards other people.

As is known, before answering a call most people try to understand whom the call is coming from, so as to be able to decide whether or not to answer the call or to prepare themselves properly for the conversation. In order to recognize the user, one may look at the telephone number of the incoming call, which is normally displayed on the phone, or one may consider other information (names, images, texts, etc.) that the phone may store in its memory and reproduce in visual or audible form or through combinations of images and sounds. In many circumstances (e.g., when driving, when there are other people around, when taking a shower, or in other particular conditions), the most useful means for recognizing the caller is a differentiated ringtone. Many telephone apparatuses allow associating differentiated ringtones to the numbers stored in the phone book, but this feature has a few drawbacks: entering differentiated ringtones into the phone book is a time-consuming task; additional ringtones have supplementary costs, adding up to those already incurred for purchasing the mobile terminal; playing a particular ringtone associated with a specific person may create embarrassment and jeopardize one's privacy, allowing other people to guess who the caller may be.

U.S. Pat. No. 7,586,031 B1 to BAKER describes a method that alleviates some of the above-mentioned drawbacks by creating a ringtone that depends on the number of the telephone line from which the call is coming. According to this method, a musical note is made to correspond to each one of the digits that make up the telephone number, the pitch (frequency) of such note depending on the digit value. For example, according to the scientific sound pitch notation, the note C4 (fourth-octave C) corresponds to digits with value "1", the note D4 (fourth-octave D) corresponds to digits with value"2", etc. The note duration depends on the position of the digit within the telephone number, in accordance with a predefined scheme. For example, the first and second digits of the telephone number correspond to notes having the duration of a "Crotchet", the third digit of the telephone number corresponds to a note having the duration of a "Minim", etc. With a ringtone of this kind one no longer has to customize phone book sounds, thus avoiding any embarrassment that might be caused by associations between musical themes and people. Costs and privacy problems are also reduced. The succession of musical notes thus produced is however random, just like the succession of digits in a telephone number; therefore, unpleasant or dissonant note sequences may be produced. In order to reduce the annoying effects of such successions, the sequence of musical notes is interrupted by long pauses: for ten-digit telephone numbers (which is the most common length of telephone numbers), the ten-note sequence is divided into three parts by two pauses (three notes, pause, three notes, pause, four notes), so that the ringtone will be perceived as a succession of three groups of notes. The pauses attenuate the effects of discordant sequences, but they also sound strange, and the composition is not always harmonious and easily distinguishable.

United States patent application US 2013/303132 A1 by KWONG describes a method for creating ringtones that depend on characteristic data of the call and of the caller; such data may include the country and the city from which the call has been originated, the caller's name, the local time of call activation, and more. Ringtones are thus created by combining national anthems, musical themes related to the cities with which the callers have been associated, sounds corresponding to the time of the call, and other elements. Some data pertaining to the caller may be included in the phone book of the phone receiving the call, while other data may be obtained from location systems; musical elements are retrieved from a database. The ringtone may also comprise a vocal part generated by a voice synthesizer, which, for example, provides information about the rates that will be incurred for answering the incoming call. This patent application contains no teaching as to the generation of a melody on the basis of the number of the line from which the call is coming.

United States patent application US 2008/066609 A1 describes a system for generating telephone ringtones, which is based on a "Cellular Automaton" (CA) that associates one note from a predefined table with each digit of a telephone number. The method of composing a succession of such notes allows setting limits for frequency jumps and other restrictions, but it does not allow specifying criteria for preventing the production of unpleasant sequences of notes or hardly distinguishable compositions within short periods of time. Moreover, the sequences generated by this system are non-cyclic, i.e., they are not periodically repeated, so that they turn out to be difficult, or even impossible, to memorize for a person.

SUMMARY OF THE INVENTION

The present invention aims at solving this and other problems by providing an apparatus and a method for producing a "reproducible audio information sequence" (melody), hereafter simply referred to as "audio information sequence" or even just as "audio sequence", which is dependent on a sequence of symbols, in accordance with a procedure that allows obtaining harmonious and easily distinguishable audio sequences that biunivocally correspond to a set of numeric symbols or symbols of another nature (e.g., phone numbers or parts thereof, alarms, commands, etc.).

The basic idea of the present invention is to generate an audio information sequence by associating with at least one first symbol of said sequence of symbols a "reproducible audio information element" (hereafter simply referred to as "audio element") chosen from a given set of audio elements on the basis of the value of said first symbol and of the value of at least one second symbol that, in said sequence of symbols, precedes or follows said first symbol.

In this manner, it is possible to concatenate audio elements together while paying attention to the harmony of the sequence and avoiding any hardly distinguishable or memorizable sequences.

The method of the present invention provides the possibility of having, for each symbol of the sequence of symbols, a number of audio elements which is greater than the cardinality of the set of values that the corresponding symbol can take, so as to be able to exclude from the total number of composable audio sequences those combinations of audio elements that will originate unpleasant or poorly distinguishable audio sequences. The limitation of the number of generated audio sequences compared to the number of audio sequences that can be generated with such redundancy is determined by rules that associate a musical element with a symbol of the sequence of symbols on the basis of the value of said symbol with which the audio element must be associated and of the value of at least one other symbol of the sequence.

BRIEF DESCRIPTION OF THE DRAWINGS

These features, the effects deriving therefrom, as well as further advantages of the present invention will become more apparent from the following description of an embodiment thereof as shown in the annexed drawings, which are supplied by way of non-limiting example, wherein:

FIG. 5 shows a second associative table that illustrates a second example of criteria that can be used for associating one audio element of those contained in two non-separate sets of audio elements with one symbol of a sequence of decimal digits;

FIG. 7 shows a fourth associative table that illustrates a fourth example of criteria that can be used for associating one audio element of those contained in two separate sets of audio elements with a last symbol of a sequence of decimal digits;

DETAILED DESCRIPTION OF THE PREFERRED EMBODIMENTS

In this description, any reference to "an embodiment" indicates that a particular configuration or structure or feature described in relation to that embodiment is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
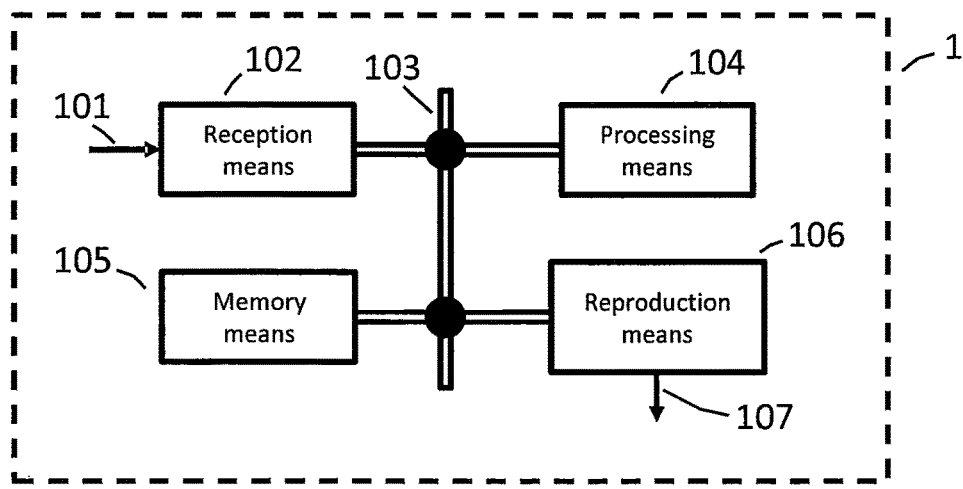
FIG. 1 is a block diagram of the apparatus according to the present invention.

Also with reference to FIG. 1, the following will describe an embodiment of an apparatus 1 according to the invention, wherein said user apparatus 1 is preferably a cellular phone or a smartphone, but may also be a tablet or a modem or any device configured for receiving sequences of symbols carrying information to be reproduced for a person's attention.

This apparatus 1 comprises the following parts:
reception means 102 adapted to receive from a connection 101 and decode a signal in which at least one sequence of symbols is encoded to which an audio sequence will be made to correspond; typically, the sequence of symbols may represent a telephone number or a part thereof, but it may also represent a command issued remotely, possibly with the indication of the source, or one of a number of possible alarms to which an operator must pay attention, or any other kind of information that may conveniently be provided by means of recognizable audio reproduction;
memory means 105 (e.g., a ROM, EEPROM, NAND memory or the like) storing a plurality of audio elements, which will be further described below;
processing means 104 (e.g., a CPU, FPGA, CPLD, ASIC or the like) configured for associating an audio element contained in the memory means 105 with each symbol of said sequence of symbols, and for concatenating the audio elements thus associated in such a way as to form an audio information sequence corresponding to the received sequence of symbols;
means for outputting audio sequences 106, which may be audio reproduction means suitable for cyclically reproducing the audio information sequence or interfaces suitable for outputting said sequence in electronic form, as will be further described below.

The apparatus 1 may also comprise a multiwire connection 103, also referred to as "bus" 103, through which the parts 102, 105, 104, 106 of the apparatus 1 can exchange data. The apparatus 1 additionally comprises power supply means (not shown in the annexed drawings), for supplying power to said apparatus by means of a battery or an electric grid. Power can be supplied to the various parts of the apparatus via the multiwire connection 103 or through other means known to those skilled in the art.

It is nevertheless possible for the man skilled in the art to adopt alternative solutions for exchanging data among the different parts of the apparatus 1 (e.g., star connections or the like) and for supplying power to said apparatus 1 (e.g., solar or thermal energy, etc.), without however departing from the teachings of the present invention.

The processing means 104 are configured for associating one of the audio elements with at least one first symbol comprised in said sequence of symbols on the basis of said first symbol and of at least one second symbol that, in said sequence of symbols, precedes or follows said first symbol. In this way a sequence observing harmony rules can be generated, which rules may possibly be encoded, for example, into the memory means by using a program that can be executed by the processing means 104. In fact, in order to generate a harmonic sequence of musical notes or beats, the choice of a particular audio element to be associated with a symbol of the received sequence must generally be made on the basis of the value of said symbol and also of the audio elements associated, or to be associated, with other symbols, i.e., also on the basis of the value of other symbols of the sequence of symbols. For example, the choice of an audio element to be associated with the third symbol can be made not only according to the value of said third symbol, but also on the basis of the value of the first and fourth symbols of the sequence of symbols. The following will describe an example of this type of association, wherein each audio element of the sequence is chosen on the basis of the respective symbol with which it is associated and of the value of all other symbols of the sequence of symbols.

As aforementioned, the memory means 105 preferably store the processing programs executed by the processing means 104 and the data relating to the audio elements to be associated with the symbols of the sequence of symbols to be converted into sound.

The means for outputting audio sequences 106, through which the apparatus 1 outputs the audio information sequences, may be audio reproduction means or means for outputting audio signals in an electronic format that allows them to be reproduced by apparatuses external to the apparatus 1, or said means 106 may comprise both audio reproduction means and means for outputting audio signals in electronic format.

When the means for outputting audio sequences 106 comprise audio reproduction means, these may include converters (not shown in the annexed drawings) to convert the signal format (e.g., from digital to analog), physical characteristic adapters (e.g., for amplitude amplification, frequency component filtration and equalization), and the like. In addition, said means 106 may also comprise a loudspeaker (not shown in the drawings) and an output 107, to which external apparatuses can be connected for reproducing the audio information sequence (e.g., an earphone, a loudspeaker external to the apparatus 1, a Bluetooth transceiver, or the like).

If the means for outputting audio sequences 106 comprise means for outputting audio sequences in electronic format, these may include format adapters for protocols known to those skilled in the art, through which sounds are represented in descriptive form (MIDI, OSC, or the like), and converters of audio file formats (e.g., MP3, WAV, AAC, AIFF, WMA, etc.), also known to those skilled in the art. Furthermore, said means may also issue commands for sound volume control, commands for starting, cyclically reproducing and interrupting the reproduction of audio sequences, and the like.

The audio elements to be associated with the symbols of the sequence of symbols may be contained in files in known numeric formats (MP3, WAV, AAC, AIFF, WMA, etc.) or represented in a descriptive form through one of the protocols known to those skilled in the art (MIDI, OSC, or the like). In this latter case, the audio reproduction means possibly included in the means 106 must comprise a sound generator or synthesizer capable of reading and interpreting the information transmitted through one or more of such protocols, and of reproducing sounds corresponding to said descriptive data.

In summary, the apparatus 1 is configured for executing a method for generating audio information sequences, which comprises the following phases:

a. receiving a sequence of symbols carrying a piece of information, e.g., a telephone number, a command, an alarm, etc.;

b. generating an audio information sequence by associating an audio element with each symbol of said sequence of symbols in a manner such that one of the audio elements is associated with at least one first symbol comprised in said sequence of symbols on the basis of the value of said first symbol and of the value of at least one second symbol that, in said sequence of symbols, precedes or follows said first symbol, so that the resulting audio information sequence will be harmonious and distinguishable from other sequences that the apparatus can reproduce;

c. reproducing the audio information sequence generated during the generation phase (phase b.) and/or making it available in a numeric format.

It must be pointed out that phases a.-c. can be carried out by the apparatus 1 also concurrently, i.e., phase b. can be started when phase a. has not ended yet, and phase c. can be started when phase b. is still under way, thus advantageously shortening the time of execution of the method by the apparatus 1.

For a better understanding of the invention, the following will describe a preferred embodiment of the apparatus 1, which carries out the above-described method according to the invention.

Figure 2:
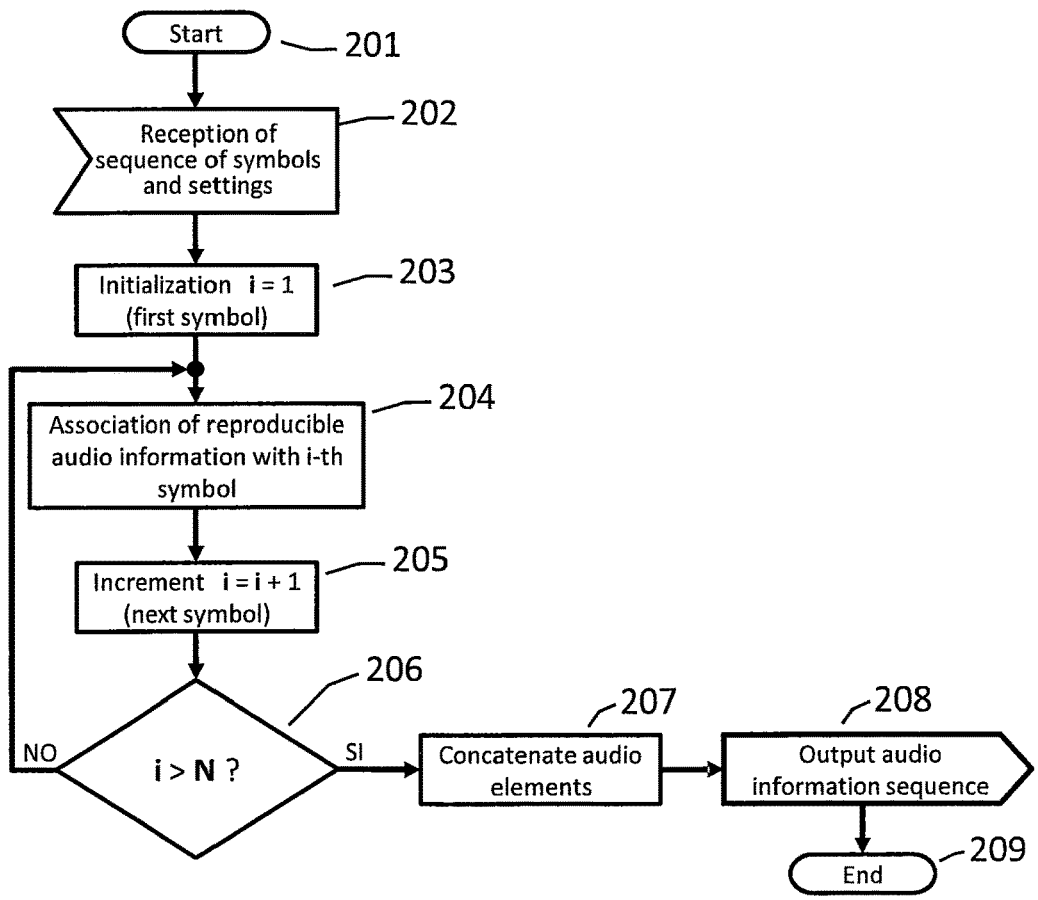
FIG. 2 is a flow chart that shows the process of producing an audio information sequence according to the present invention.

Also with reference to FIG. 2, there is shown a flow chart of one possible process through which the apparatus 1 produces an audio information sequence. After the start 201, said process comprises the following steps:

a step 202 of receiving the sequence of symbols, wherein the apparatus 1 carries out step a. of the above-described method, i.e., it receives a sequence of N symbols to which an audio information sequence is made to correspond, and sets the values of the variables dependent on such sequence;

a step 203 of setting an index that scans the N symbols of the sequence, wherein an index i is set to the unitary value, corresponding to the first symbol of the sequence;

an association step 204, wherein the apparatus 1 associates an audio element with the i-th symbol of the sequence of symbols only on the basis of the value of said i-th symbol, or on the basis of the value of said i-th symbol and of the value of at least one other symbol of the sequence of symbols;

an incremental step 205, wherein the index i that scans the N symbols of the sequence is incremented by one unit;

a determination step 206, wherein it is determined if audio elements have been associated with all the symbols of the sequence of N symbols, i.e., whether or not the index i has exceeded the value N; if the value of i is not greater than N, then the process returns to step 204, wherein an audio element is associated with the symbol of index i, otherwise the process goes on to the next step 207;

a concatenation step 207, wherein the audio elements associated with the single symbols of the sequence of symbols are concatenated to form an audio information sequence;

an output step 208, wherein the apparatus 1 carries out step c. of the above-described method, i.e., it reproduces the audio information sequence and/or makes it available in a numeric format.

Figure 3:
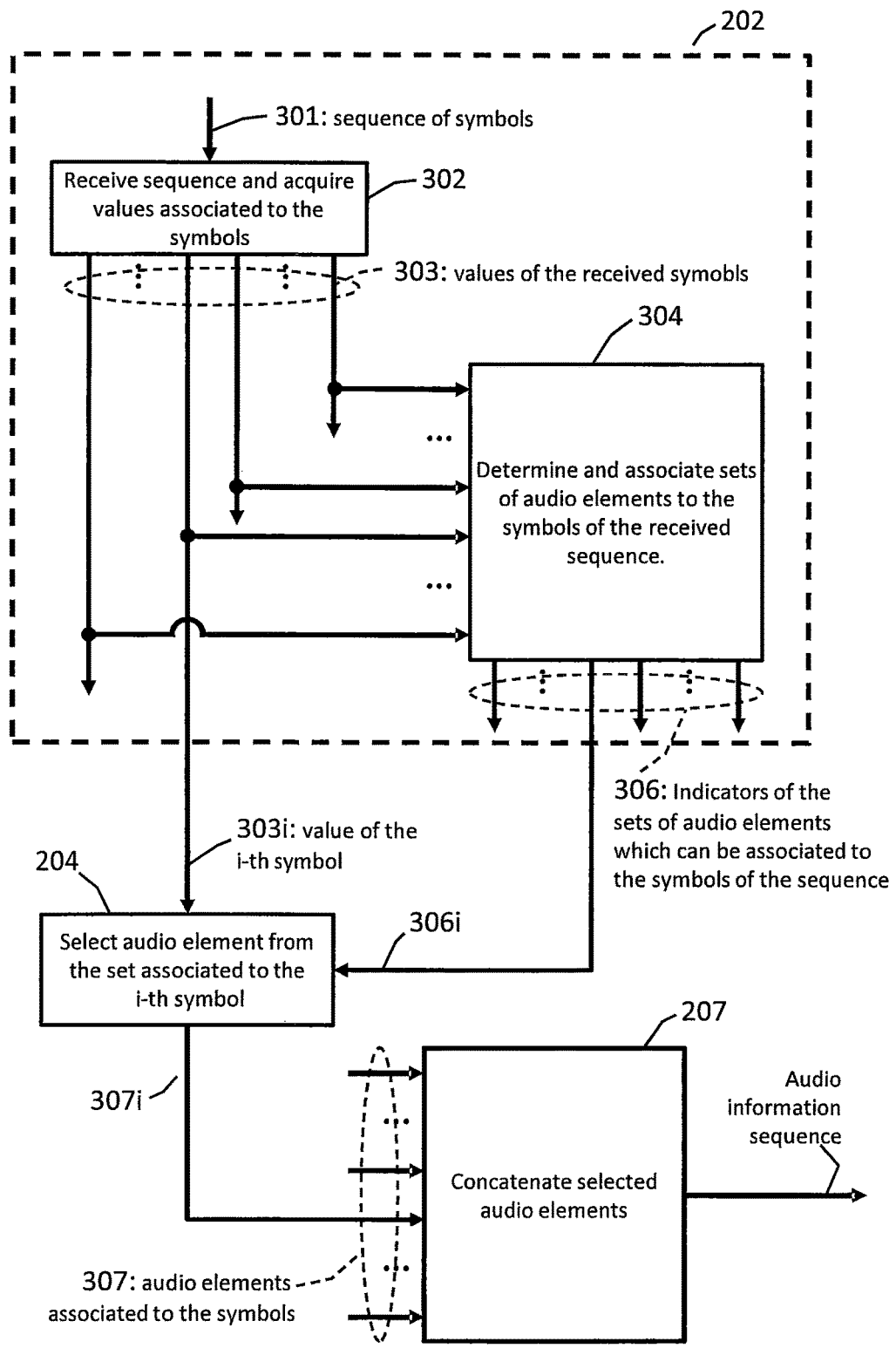
FIG. 3 is a flow chart that shows in detail a procedure for associating audio elements with symbols of the sequence of symbols within the process illustrated in FIG. 2.

Also with reference to FIG. 3, the following will illustrate a way to associate the audio elements with the symbols of the sequence of symbols, which is typical of a preferred embodiment of the invention.

In FIG. 3 some elements or groups of elements are labeled with the same numbers as some elements included in FIG. 2, so as to make clear that they represent an example of embodiment of the same function. The set 202 of FIG. 3 represents, in fact, the step of receiving the sequence of symbols (over the connection 301) and the settings depending on such sequence, which step comprises acquiring the values of the single symbols 302 and determining the sets of audio elements associable with the symbols of the sequence 304. In FIG. 3 the information about the single symbols are shown to be distinctly conveyed on connections dedicated to each symbol (which are grouped under common labels 303, 306 and 307), to indicate that a part of such information must be processed in parallel, as well as to point out, in particular, that the determination 304 of each set of audio elements to be associated with the single symbols of the sequence may depend, in general, on the value of various symbols of the sequence. The man skilled in the art will however understand that the same processing may be carried out in different ways, and that such information may be conveyed in series over common connections. For each symbol i of the sequence of symbols, it is assumed that the block 202 provides the value of the symbol (connection 303i) and the indication of the set of alphanumeric elements that can be associated therewith (connection 306i).

Considering only a generic i-th symbol of the sequence, the processing step 204 associates therewith the audio element identified by said two data, the former of which (i.e., the value of the i-th symbol) only depends on the i-th symbol itself, whereas the latter (i.e., the indication of the set of associable audio elements) may also depend on the values of other symbols of the sequence that precede or follow the i-th symbol. This dependence of the set of audio elements associable with the i-th symbol on other symbols is useful, for example in the case of musical audio elements, for preserving tone colour, scale and rhythm coherence, for applying criteria narrowing the element selection to those elements which avoid unpleasant sequences, etc. It is therefore apparent that the choice of the set of audio elements associable with a given symbol i can be dependent on the symbols that precede the symbol i, but this also applies to cases wherein said choice also depends on symbols that follow the symbol i, as will be shown below by means of an example.

Once the set of audio elements that meets these criteria has been determined, which contains only symbols that can be associated with said i-th symbol, at step 204 a particular audio element is selected on the basis of the value of the same i-th symbol.

Assuming that the different symbols of the sequence are processed in parallel, FIG. 3 does not show a repetitive cycle scanned by an index i as in FIG. 2, but it is hypothesized therein that step 204 is carried out in parallel for each symbol of the sequence. For simplicity, no duplicates of the graphic elements relating to step 204 are shown, since the actual configuration of the drawing will be apparent to the man skilled in the art. The man skilled in the art will also be able to indicate how step 204 will have to be carried out, by processing in succession the information about the single symbols of the sequence.

For uniformity, in FIG. 3 the concatenation of the audio elements (step 207) is represented with the assumption that the audio elements corresponding to the various symbols are available in parallel on the connections 307. It will however be clear to those skilled in the art that also step 207 may advantageously be carried out serially.

Step 202, instead, can only be carried out serially if the determinations 304 of the sets of audio elements associable with the symbols of the sequence do not depend on symbols that precede the one for which a given set is being determined. This condition is not always met, especially for the first symbol of the sequence; therefore it must be assumed, in general, that step 202 is carried out in parallel on the symbols of the sequence.

To make the method of the invention clearer, the following will illustrate some examples of generation of an audio information sequence and some rules to be observed when associating audio elements with the symbols of the sequence of symbols. For simplicity, and for explanation purposes, all examples will take into consideration only a sequence of symbols consisting of four decimal digits (0-9), which may be the last four digits of a telephone number.

It is however to be understood that the method is also applicable to sequences containing a greater or smaller number of symbols (of course, not less than two), and to symbols other than decimal digits. Furthermore, in the examples it will be assumed that the audio elements consist only of musical beats, or pairs of musical beats, although other types of audio elements, such as single notes or various sequences of notes and pauses, recorded or synthesized vocal passages, etc., may generally also be used as audio elements.

The association rules are represented in FIGS. 4-8 by means of associative tables, each of which indicates a rule for associating an audio element (a musical beat or a pair of musical beats) with a first symbol of the sequence of symbols on the basis of the value of said first symbol; in some cases, such tables associate with said first symbol also one or more identifiers that identify associative tables to be used for assigning audio elements to other symbols.

The rule examples will be described step by step, starting from the first digit of the four-symbol sequence.

Figure 4:
FIG. 4 shows a first associative table that illustrates a first example of criteria that can be used for associating an element contained in a set of musical audio elements with one symbol of a sequence of decimal digits, and how said symbol affects the association of other audio elements with the sequence of decimal digits.
Figure 4:
Figure 4:
Figure 4:
Figure 4:
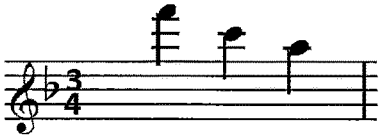
Figure 4:
Figure 4:
Figure 4:
Figure 4:
Figure 4:

Also with reference to FIG. 4, a first associative table T1 will now be described, showing a set of ten audio elements that can be associated with the first symbol (which is a decimal digit) of the sequence of (numeric) symbols of this example. In this first example, it is assumed for simplicity that the set of audio elements associable with the first symbol of the sequence (table T1, FIG. 4) is predetermined regardless of the value of any symbol, and contains a number of elements that equals the cardinality (10) of the values that the symbol can take.

The first column of table T1 represents the table key, consisting of the ten possible values that the first symbol of the sequence can take. The second column includes the audio elements of the set of audio elements associable with the values of the first symbol of the sequence; said set is labeled and identified with the letter "a". The third column indicates the sets of audio elements associable with the next symbols of the sequence (see the next three figures), specifying the labels thereof. For example, in the row of the associative table T1 corresponding to the symbol of value "0", the third column of said table T1 indicates that, if the first symbol of the sequence has the value "0", then one of the audio elements comprised in the set "b1" will be associated with the second symbol of the sequence, one of the elements comprised in the set "c" will be associated with the third symbol, and one of the elements of the set "d1" will be associated with the fourth symbol.

In this first example, all sets of audio elements associable with the symbols of the sequence are determined by the value of the first symbol of the sequence. Further details about the associative tables showing these sets of audio elements will be provided below in this description.

The first five audio elements of the set "a" of the associative table T1 consist of a complete beat ("thetic" rhythm) in 3/4 time, while the other five begin with an incomplete beat ("anacrusic" rhythm), followed by a regular beat in 3/4 time. In this example, there are four possible continuations of the elements of the set "a": the alternative between thetic rhythm and anacrusic rhythm is, in fact, taken into account, to which the finals "d1" and "d2" respectively correspond, as will be explained below; one alternative of continuations, i.e., "b1" and "b2", is also considered, as shown in FIG. 5.

Figure 5:
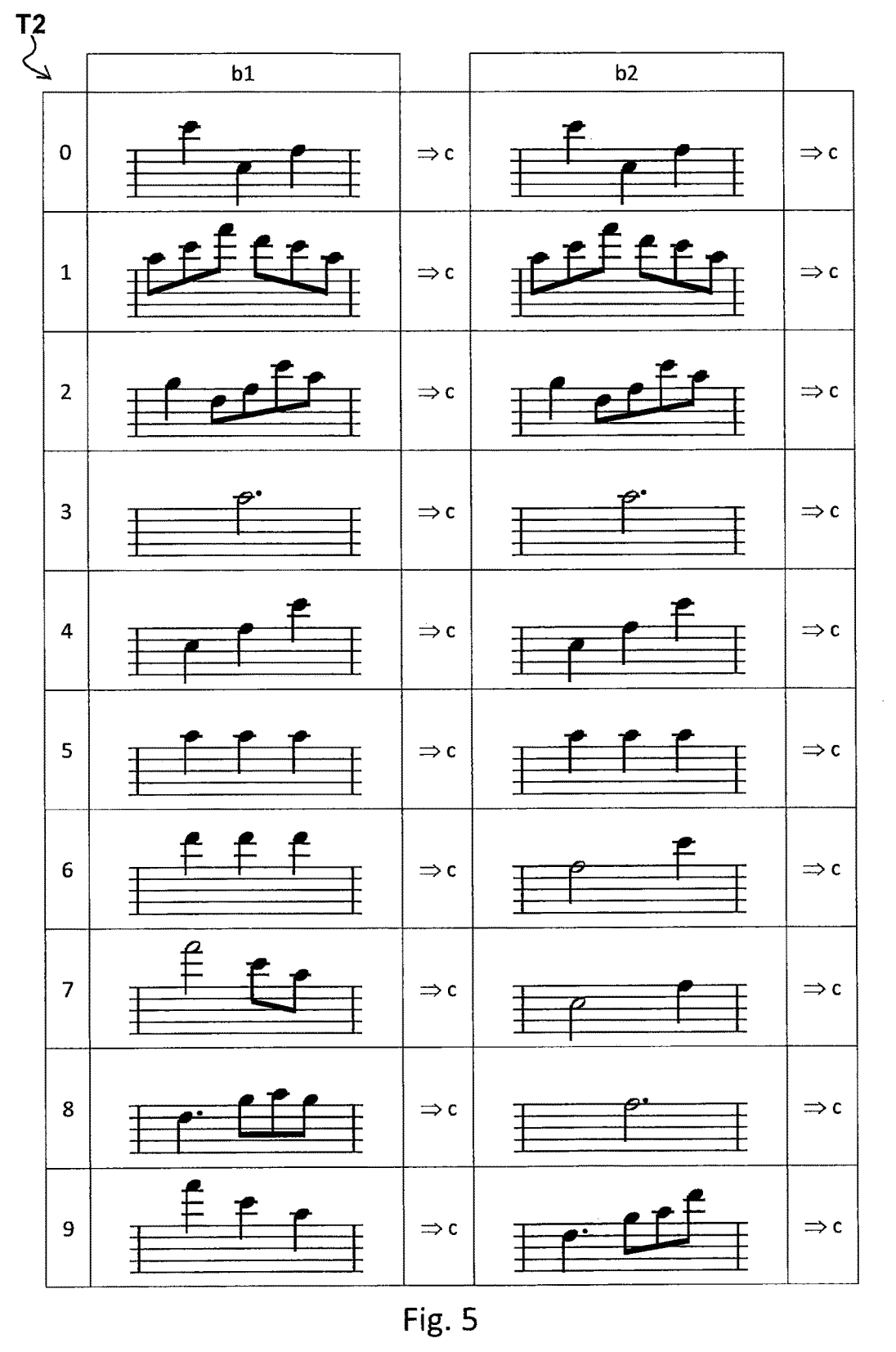

Also with reference to FIG. 5, the following will describe a second associative table T2, which is similar to table T1 but, for reasons of illustrative compactness, comprises two sets of audio elements, i.e., the set "b1" and the set "b2", and the respective identifiers that allow identifying those sets of audio elements that must follow the audio elements associated with the second symbol. Therefore, the information content of table T2 is equivalent to the information content of two distinct tables respectively comprising the sets "b1" and "b2" and having the same structure as table T1.

The first six audio elements of the set "b1" (corresponding to the digit values 0-5) are equal to the first six elements of the set "b2", having assumed that these first six elements can effectively follow every audio element of the set "a". The next elements of "b1" and "b2" are different, in order to give a more harmonious continuation to the single audio elements of the set "a".

Figure 6:
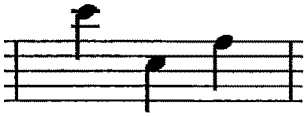
FIG. 6 shows a third associative table that illustrates a third example of criteria that can be used for associating one audio element of a set of audio elements with one symbol of a sequence of decimal digits.

The third and fifth columns of the table of FIG. 5 indicate that, in this example, the audio elements associated with the second digit are always followed by an audio element of a predetermined set "c", shown in FIG. 6.

Also with reference to FIG. 6, the following will describe the third associative table T3, which has a similar structure as the table T1 and comprises the set of audio elements "c", this set "c" contains ten distinct audio elements, as many as the values that the third symbol of the numeric sequence can take. There is thus no redundancy (which is present in table T2), and the association between the audio elements and the third symbol of the sequence is solely determined by the value of said third symbol. As far as continuation information is concerned, it must be pointed out that the audio elements associable with the fourth symbol may be contained either in the set "d1" or in the set "d2", depending on the value of the first symbol of the sequence, as mentioned above and explained in detail below.

Figure 7:
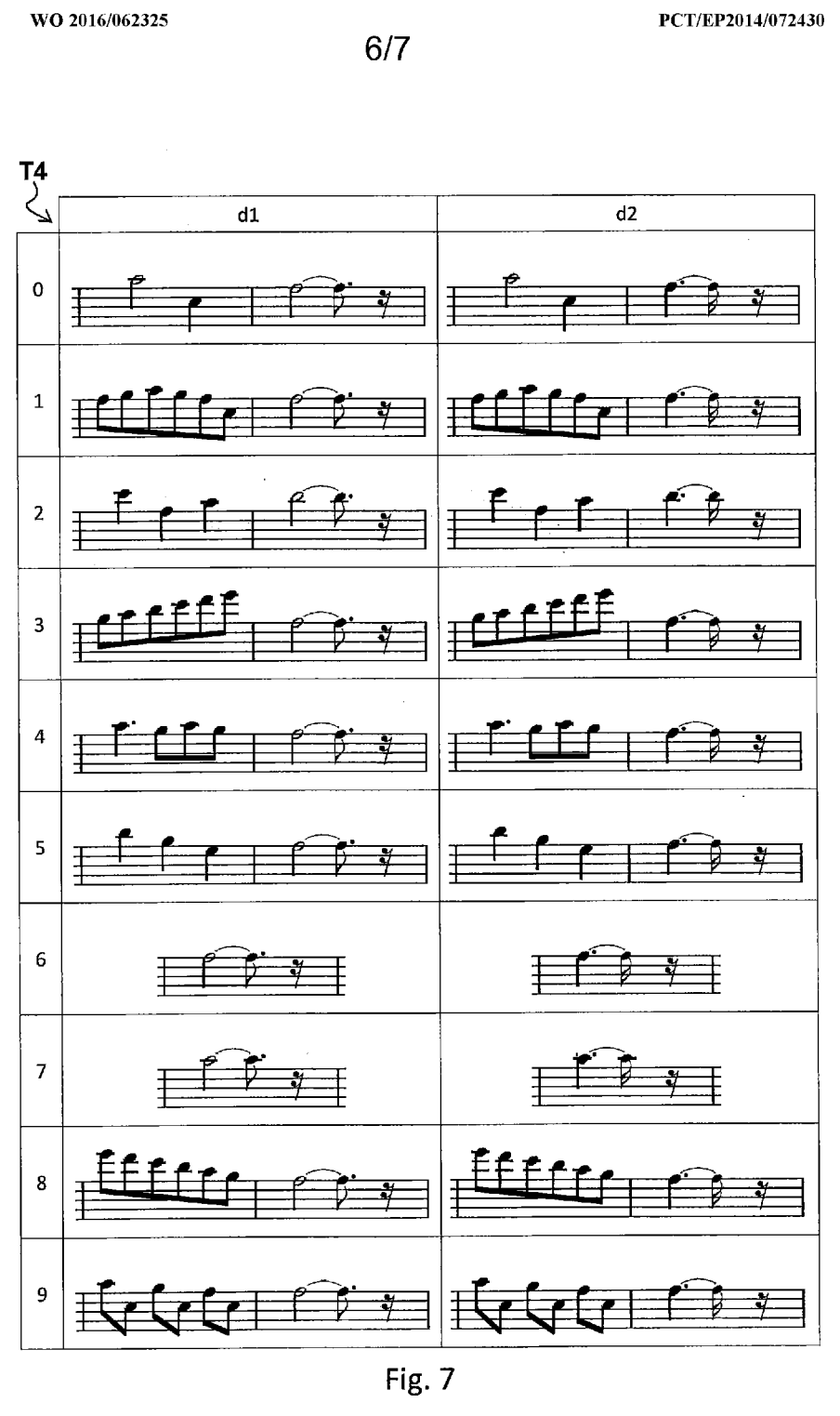

Also with reference to FIG. 7, the fourth associative table T4 will now be described, the structure of which is similar to that of table T2. It comprises two sets of audio elements, without however including the columns containing continuation information because the fourth symbol is the last of the sequence to which an element needs to be assigned.

In this table T4, the audio elements associated with the fourth symbol of the sequence are grouped into the sets "d1" and "d2". The selection between the two sets depends on the value of the first symbol of the sequence. In the event that the first symbol has a value associated with a musical audio element with an incomplete initial beat (values of the first symbol from 5 to 9 in table T1), for the last symbol the set "d2" of table T4 (FIG. 7) will be selected, the elements of which have an incomplete final beat that is complementary to the incomplete one of the elements of the first symbol. With this combination of beats, the total duration of the audio information sequence will be equal to an integer number of complete beats. Vice versa, if the first symbol has a value associated with an audio element with complete musical beats (values of the first symbol from 0 to 4 in table T1), for the last symbol the set "d1" will be selected, the elements of which consist of complete beats. In general, the audio elements of the two sets "d1" and "d2" may also differ in other characteristics, which for simplicity will not be taken into account in this explanatory example.

Assuming that the audio sequence has a duration that equals an integer number of beats, its cyclic repetition (which is the mode that is normally used for telephone ringtones) will advantageously maintain a regular rhythmic cadence, thereby making the ringtone more easily recognizable and memorizable. For the same reason, at the end of all the audio elements of the sets "d1" and "d2" there are short pauses that demarcate the end of the audio information sequence.

In the sets "d1" and "d2" there are elements consisting of a single beat and elements consisting of two beats, so that the total duration of an audio sequence may be, in this example, four or five beats.

The man skilled in the art can easily verify that the association rules applied in the example will determine, for every given sequence of symbols, one and only one audio information sequence, different from all others. The correspondence between the set of sequences of symbols and the set of audio information sequences is thus biunivocal, and advantageously avoids any ambiguity in the recognition of the information with which the audio sequence is associated.

The man skilled in the art will also be able to attain the same result by using procedures and algorithms other than those used in the examples, without grouping the audio elements into sets with a number of elements equal to the number of possible values of the symbols of the sequence to be converted into sound, as was done with the sets of audio elements of tables T1-T5 in order to simplify the explanation of the method. For example, instead of associating the two sets "b1" and "b2" with the second symbol of the sequence of symbols, one may associate a single set, referred to herein as "bU", which comprises all the elements of the set "b1" and those of the set "b2" that are different from the elements of "b1" (in the case shown in the example, the set "bU" would have 10+4=14 elements). The same thing can be done for the sets "d1" and "d2", which may be replaced with a single set "dU" of twenty elements ("d1" and "d2" are separate). The man skilled in the art will be able, in fact, to implement a method of selection of the elements of "bU" and "dU" that is perfectly equivalent to the more intuitive selection scheme illustrated by means of the sets "b1", "b2" and "d1", "d2". The following will describe an example of one such algorithm.

Furthermore, one audio element can be associated with different symbols of the sequence of symbols, such as the element "a"r4 (element in row 4 of set "a"), which is equal to both the element "b1"r9 and the element "c"r9; likewise, "b1"r1="b2"r1="c"r1 and "b2"r8="c"r8. In implementations of the invention, therefore, it may be advantageous to consider the set of all audio elements as a single group of elements, from which the audio elements to be associated with the various symbols of the sequence can be extracted each time by using appropriate algorithms.

It is not necessary that the symbols of the sequence are of the same nature, nor that they have the same number of possible values. For example, telephone numbers may also include symbols other than the ten decimal digits, such as, for example, the characters "*" and "#", which can only be found in particular positions (e.g., at the beginning or at the end of a telephone number). In such cases, the possible symbol values of some symbols of the telephone number (the sequence of symbols) are ten, whereas there is a greater number of possible values for other symbols of the telephone number.

In the example shown herein, differentiation among audio elements is provided by the musical notes and pauses contained in the element; however, the audio elements and the audio information sequences composed therewith may also be differentiated by other characteristics, whether in the musical field or in other fields. Differences may in fact be introduced as regards rhythm, tone colour, number of notes and number of beats per symbol, and pitch, duration and intensity of the notes; also, the man skilled in the art will be able to insert dyads (combinations of two notes played simultaneously), triads, quadriads, pauses, recorded or synthesized vocal segments, short musical excerpts, and other elements. A rhythm differentiation (tethic rhythm and anacrusic rhythm) has already been used in the above example in order to show how the association of audio elements with a symbol (the fourth symbol in the example) can depend on the values of other symbols of the sequence (the first one in the example).

Figure 8:
FIG. 8 shows a fifth associative table that illustrates a fifth example of criteria that can be used for associating an audio element selected from those contained in two separate sets of musical audio elements with one symbol of a sequence of decimal digits.
Figure 8:
Figure 8:
Figure 8:
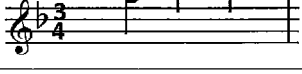
Figure 8:
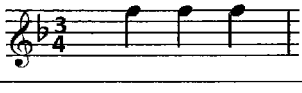
Figure 8:
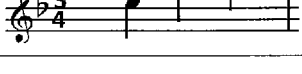
Figure 8:
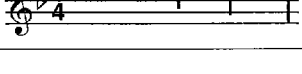
Figure 8:
Figure 8:
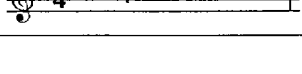
Figure 8:
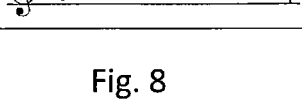

Also with reference to FIG. 8, the following will describe an example of tone colour differentiation that is effective in practical applications for distinguishing between audio sequences corresponding to different numeric sequences (the term "tone colour" refers herein to the quality of a sound that is characteristic of a musical instrument or a group of musical instruments or an orchestra, or characteristic of one or more voices or a combination of musical instruments and voices, and of other more or less sophisticated instruments).

In this second example, for the first symbol of the sequence an associative table T5 has been defined, which is similar to table T1 of the first example. The key of the two tables is the same, but table T5 also has, in addition to the same data columns as table T1, a column indicating the tone colour with which the audio elements are produced.

Table T5 comprises a set "a34" of audio elements associable with the first symbol of the sequence. As can be seen in FIG. 8, the set "a34" is divided into two subsets, identified by the tone colour information "Tone 1" and "Tone 2". This information indicates that the first five audio elements of the set "a34" are produced by using a first tone colour (identified by the string "Tone 1"), while the other five are produced by using a second tone colour (Tone 2). For simplicity, the corresponding musical beats of the two subsets Tone 1 and Tone 2 are equal, assuming that the difference in tone colour will be sufficient to distinguish between the corresponding audio elements and the respective audio sequences composed by using such elements. In general, however, said beats may also differ in other characteristics. The audio elements associated with the next symbols of the sequence will preferably be produced with the same note colour as the one used for the first symbol of the sequence. Coherently, in the last column of the table of FIG. 8 the continuation information indicates three sets ("b3", "c3", "d3") of audio elements produced with the tone colour 1 and three sets ("b4", "c4", "d4"), different from the first three, produced with the tone colour 2. For brevity, these six sets are not shown in the annexed drawings, but it is to be understood that they have the same characteristics as those shown in the previous example (see FIGS. 5-7). In particular, each one of such sets may either have no redundant elements, with respect to the number of values that the corresponding symbol can take, or have some redundant elements. As an alternative to a redundant set "b3", sets "b3a", b3b", b3c", etc. without redundancy may be taken into account (possibly non-separate ones), such that the union of "b3a", b3b", b3c", . . . equals the set "b3". As explained above, this alternative will lead to the same result. This applies to all sets of audio elements associable with the different symbols of the sequence.

It will be apparent to those skilled in the art that the set "a34" may comprise any number of subsets, whether without any redundancy, like the two tone colours of FIG. 8, or with redundant elements with respect to the cardinality of the values of the first symbol of the sequence. For example, to the two subsets Tone 1 and Tone 2 of the set "a34" a subset Tone 3 can be added, which is identical to the first two except for the tone colour with which the audio elements are produced. In this case, the audio elements of the set "a34" are fifteen, and are therefore redundant with respect to the cardinality of the symbol values. Let us now assume that said fifteen elements are numbered from 0 to 14 (from 10 to 14 those of Tone 3). In order to distribute the audio information sequences among the three tone colours, one may associate with the first symbol of the numeric sequence the audio element that corresponds to an index "Ia", calculated by using the following formula:

$$Ia=[v1+Np(S \bmod Ns)] \bmod Na \quad (1)$$

where the symbols have the following meanings (the values of the above example are shown between braces):
Ia index of the audio element to be associated with the symbol $\{0 \leq Ia \leq 14\}$;
v1 value of the first digit (symbol) of the sequence of symbols $\{0 \leq v1 \leq 9\}$;
Np number of audio elements in each subset $\{Np=5\}$;
S sum of the values of the digits of the sequence of symbols;
Ns number of subsets of the set "a34" $\{Ns=3\}$;
Na total number of audio elements in the set "a34" $\{Ns=15\}$;
S mod Na functions that gives the remainder of the division of S by Na;
( . . . ) mod Na function that gives the remainder of the division of the expression between brackets by Na.

The formula 1 represents an example of an algorithm through which a redundant set of audio elements can be associated with the set of values of one symbol, so that, when applied to all symbols of the sequence, each sequence of symbols will be made to correspond to one and only one audio information sequence, different from all others, i.e., so that the correspondence between the set of sequences of symbols and the set of audio information sequences will be biunivocal. The man skilled in the art may also propose other formulas providing the same result; therefore, the above formula and criteria are not to be considered as exhaustive, nor will they limit the ways in which the associations between audio elements and sequence symbols can be determined.

As aforesaid, as an alternative to a redundant set one may use several individually non-redundant sets. In the case of the set "a34" comprising three five-element subsets, one may define, for example, three non-redundant sets "a34a", "a34b" and "a34c", wherein "a34a" is given by the union of the subsets Tone 1 and Tone 2, "a34b" is given by the union of the subsets Tone 2 and Tone 3, and "a34c" is given by the union of the subsets Tone 1 and Tone 3. The man skilled in the art will immediately infer that, by selecting one of the three sets "a34a", "a34b" and "a34c" on the basis of the formula S mod Ns (shown in connection with the formula (1)) and by placing the elements of the set thus selected into biunivocal correspondence with the value of the first symbol of the numeric sequence, one will obtain the same result as by applying the formula (1) by using the fifteen-element set "a34".

As already pointed out, in the first example of association of audio elements with the symbols of the sequence illustrated above with reference to FIGS. 4-7, all sets of audio elements associable with the symbols of the sequence are determined by the value of the first symbol. Said example shows, therefore, how the set of audio elements associable with one symbol of the sequence can be determined by the value of one of the preceding symbols. The examples provided with reference to FIG. 8 show, instead, how the set of audio elements associable with one symbol of the sequence can be determined by a combination of the values of all symbols of the sequence, and hence also by the values of symbols following the one under consideration; moreover, said examples show how a non-redundant set of audio elements can be divided into subsets, and how the audio elements of a redundant set, divided into subsets, can be univocally associated with the values of a symbol of the sequence. In the light of these examples, the man skilled in the art will be able to conceive extensions to other cases of interest, such as the determination of a set of audio elements on the basis of any number of symbols of the sequence and of symbols that may take any number of values, such as, for example, alphanumeric symbols, emoticons, groups of Unicode characters, etc.

The above examples highlight the fact that the method of the present invention allows audio information, typically a melody, to be automatically associated with a given sequence of symbols, wherein such audio information can be diversely articulated, harmonious and easily distinguishable and memorizable.

When applied to telephones, even without any action by the user, this method can create ringtones that make the telephone numbers of incoming calls distinguishable. Besides not requiring the user to retrieve ringtones and enter numbers into the phone book, this method relieves him/her from the trouble of associating particular musical themes to his/her contacts. In addition, the method also allows recognizing, based on the melody thus generated and reproduced, the numbers of entities not included in the phone book of the user apparatus 1.

Musical audio elements are preferably groups of musical notes typically forming musical beats, or groups of beats, in a given musical time (e.g., 4/4, 3/4 or the like). In general, however, audio elements may comprise any number of musical notes and other sound elements of various nature.

The audio information sequences generated in accordance with the method of the invention can be produced by a low-cost software application, whether downloadable from an online site or preloaded into telephone apparatuses. In this latter case, the telephone apparatus may be already configured for executing the method of the invention (without requiring the user to take any action), or the user may be only required to select an option for activating the functions offered by the method of the invention. In order to activate or deactivate the execution of the method according to the invention, one may use, for example, voice commands, gestures or the like, without however departing from the teachings of the present invention.

The ringtones produced by the method according to the invention can be set for distinguishing between phone calls, SMS texts with sender's identification (as a supplement to the sender's identification, a phone call can be distinguished from an SMS text by adding appropriate preambles or codes to the audio sequence that identifies the sender), events (e.g., the occurrence of an event present in a calendar), and other information. In fact, the method of the present invention allows wide customization, including, in particular, measures for safeguarding the confidential nature of the caller's identity.

For users wanting to change the standard settings of the associations between ringtones and telephone numbers, several options are available. For example, one can re-mix, preferably by using a (pseudo) random number generator, the values of the index (i.e., the key values) of one or more tables T1-T5 that specify the audio elements within the sets relevant to the single symbols of the sequence. This simple operation, which can be repeated several times, allows preserving the confidential nature of the associations between ringtones and telephone numbers, and differentiates the user apparatus 1 from other apparatuses.

As an alternative to or in combination with said index re-mixing, it is possible to interpose a conversion between the sequence of symbols received and decoded by the apparatus 1 and the sequence of symbols used for determining the selections of the audio elements that will constitute the ringtone. Through a selective conversion of this kind, one can generate the same ringtone for different telephone numbers, so as to have a single recognition sound for contacts that, for example, use more than one telephone line, or one can periodically change the ringtones associated with some contacts to safeguard the privacy of their identities.

In order to avoid that two or more user apparatuses 1 will reproduce identical audio sequences upon receiving the same sequence of symbols, the audio information sequence can be complemented with a preamble and/or a coda (end) which are specific of the apparatus 1, i.e., an audio sequence for recognizing the apparatus 1, e.g., generated on the basis of the subscriber number of one or more SIM cards inserted in said apparatus 1. In addition to the caller's identity, it is also possible to discern, from the sound, which event the audio sequence is associated with (e.g., reception of a message to a user's preset number, reception of a phone call to a user's specified number, event previously set in the calendar, etc.).

In summary, the processing means 104 of the apparatus 1 can also be configured for concatenating an audio sequence for recognizing the apparatus 1 at the beginning or at the end of said audio information sequence. Furthermore, said apparatus 1 may also comprise a subscriber identity module (e.g., a telephone SIM card) containing identification information that allows identifying the owner of the telephone number to which the call or text is directed, wherein said identification information can be used by the processing means 104 for determining the audio recognition sequence.

In telephones and other apparatuses, the same device that produces audio information sequences according to the present invention can also be used for signaling, in a differentiated manner, various other types of events, such as alarms set for special reasons, reception of messages with specific features, calendar events, etc. Event type distinction can be obtained, for example, by entering special characters, corresponding to specific audio elements, into the sequences of symbols to be audibly reproduced. Such characters may determine the production of audio sequences with particular tone colours, rhythms, intensity and frequency dynamics and other special features, reminding of the type of event to which they refer.

The invention may therefore be subject to many variations, without however departing from the novelty spirit of the inventive idea. It will be apparent to those skilled in the art that in the practical implementation of the invention the illustrated details may have different shapes or be replaced with other technically equivalent elements. It can therefore be easily understood that the present invention is not limited to the explanatory examples described herein, but may be subject to many modifications, improvements or replacements of equivalent parts and elements without departing from the basic inventive idea, as set out in the following claims.

The invention claimed is:

1. An apparatus comprising:
   reception means for receiving and decoding a signal in which at least one sequence of symbols is encoded,
   memory means for storing a plurality of reproducible audio elements,
   processing means for associating a reproducible audio element contained in the memory means with each symbol of said sequence of symbols, so as to form a reproducible audio information sequence,
   means for outputting audio sequences, configured for cyclically reproducing said reproducible audio information sequence when the reception means receive and decode a signal in which said sequence of symbols is encoded,
   wherein the processing means associate one of the reproducible audio elements with at least one first symbol comprised in said sequence of symbols on the basis of said first symbol and on the basis of at least one second symbol that, in said sequence of symbols, precedes or follows said first symbol.

2. The apparatus according to claim 1, wherein the cardinality of at least one set of values that a symbol of said sequence of symbols can take is smaller than the total number of audio elements associable with said symbol.

3. The apparatus according to claim 1, wherein the processing means is also configured in a manner such that the generated reproducible audio information sequence is in biunivocal correspondence with the sequence of symbols.

4. The apparatus according to claim 1, comprising conversion means for making an audio information sequence corresponding to a second sequence of symbols correspond to a first sequence of symbols.

5. The apparatus according to claim 1, wherein the sequence of symbols is a sequence of decimal digits.

6. The apparatus according to claim 1, wherein the reproducible audio information sequence has a tone colour, and wherein the processing means is configured for determining said tone colour on the basis of at least one of the symbols of the sequence of symbols.

7. The apparatus according to claim 1, wherein the processing means is also configured for concatenating one or more audio recognition elements at the beginning and/or at the end of the reproducible audio information sequence.

8. The apparatus according to claim 7, comprising an apparatus identity module that contains at least identification information identifying said apparatus, and wherein the processing means is also configured for determining the apparatus recognition audio elements on the basis of said identification information.

9. A method for generating a reproducible audio information sequence, comprising the phases of:
   a. receiving a sequence of symbols,
   b. generating a reproducible audio information sequence by associating one reproducible audio element with each symbol of said sequence of symbols, so that the audio information sequence can be cyclically reproduced,
   c. reproducing the reproducible audio information sequence generated during the generation phase b.,
   wherein in the course of the generation phase b., one of the reproducible audio elements is associated with at least one first symbol comprised in said sequence of symbols on the basis of said first symbol and on the basis of at least one second symbol that, in said sequence of symbols, precedes or follows said first symbol.

10. The method according to claim 9, wherein the cardinality of at least one set of values that a symbol of said sequence of symbols can take is smaller than the total number of audio elements associable with said symbol.

11. The method according to claim 9, wherein the reproducible audio information sequence generated during the generation phase b. is in biunivocal correspondence with the sequence of symbols received during the reception phase a.

12. The method according to claim 9, comprising a conversion phase wherein a first sequence of symbols is made to correspond to an audio information sequence corresponding to a second sequence of symbols.

13. The method according to claim 9, wherein the sequence of symbols is a sequence of decimal digits.

14. The method according to claim 9, wherein the reproducible audio information sequence has a tone colour that is determined on the basis of at least one of the symbols comprised in the sequence of symbols.

15. The method according to claim 9, wherein, during the generation phase b., one or more audio recognition elements are concatenated at the beginning and/or at the end of the reproducible audio information sequence.

16. The method according to claim 15, wherein said audio recognition elements are determined on the basis of information identifying an entity.

17. A computer program product which can be loaded into the memory of an electronic computer, and which comprises portions of software code for executing the phases of the method according to claim 9.

* * * * *